US012299904B2

(12) United States Patent
Schlattmann et al.

(10) Patent No.: US 12,299,904 B2
(45) Date of Patent: May 13, 2025

(54) TRACKING DYNAMICS USING A COMPUTERIZED DEVICE

(71) Applicant: AGT INTERNATIONAL GMBH, Zurich (CH)

(72) Inventors: Markus Schlattmann, Griesheim (DE); Thomas Bader, Pfungstadt (DE); Robert Biehl, Darmstadt (DE); Philipp Huelsdunk, Berlin (DE); Paul Idstein, Reichelsheim (DE); Michael Leigsnering, Muhltal (DE); Sergey Sukhanov, Darmstadt (DE)

(73) Assignee: AGT INTERNATIONAL GMBH, Zurich (CH)

( * ) Notice: Subject to any disclaimer, the term of this patent is extended or adjusted under 35 U.S.C. 154(b) by 471 days.

(21) Appl. No.: 17/638,073

(22) PCT Filed: Aug. 26, 2020

(86) PCT No.: PCT/IL2020/050932
§ 371 (c)(1),
(2) Date: Feb. 24, 2022

(87) PCT Pub. No.: WO2021/038565
PCT Pub. Date: Mar. 4, 2021

(65) Prior Publication Data
US 2022/0277463 A1   Sep. 1, 2022

Related U.S. Application Data

(60) Provisional application No. 62/891,515, filed on Aug. 26, 2019.

(51) Int. Cl.
*G06T 7/246* (2017.01)
*H04N 23/61* (2023.01)
*H04N 23/951* (2023.01)

(52) U.S. Cl.
CPC ............ *G06T 7/251* (2017.01); *H04N 23/61* (2023.01); *H04N 23/951* (2023.01); *G06T 2207/30241* (2013.01)

(58) Field of Classification Search
None
See application file for complete search history.

(56) References Cited

U.S. PATENT DOCUMENTS

| 6,072,504 A | 6/2000 | Segen |
| 2011/0267461 A1 | 11/2011 | Birenboim et al. |

(Continued)

FOREIGN PATENT DOCUMENTS

| CN | 102693007 A | 9/2012 |
| EP | 2115699 B1 | 11/2009 |

(Continued)

OTHER PUBLICATIONS

Veeraraghavan, et al. Switching Kalman Filter-Based Approach for Tracking and Event Detection at Traffic 1 Intersections, Proceedings of the 13th Mediterranean Conference on Control and Automation, Limassol, Cyprus, Jun. 27-29, 2005, pp. 1167-1172.

(Continued)

*Primary Examiner* — Leon Viet Q Nguyen
(74) *Attorney, Agent, or Firm* — FISHERBROYLES, LLP; Roger L. Browdy; Ronni S. Jillions

(57) ABSTRACT

The presently disclosed subject matter there includes a computerized device that comprises a processing circuitry, and one or more sensors including at least one image sensor configured to continuously capture images of an environment; the processing circuitry is configured to process the captured images and: detect an object within the environment; track a trajectory of movement of the object; select a best fitting motion model to the trajectory and determine a state of the object based on the best fitting motion model; and determine at least one intersection point between the object and a target object.

18 Claims, 7 Drawing Sheets

(56) References Cited

U.S. PATENT DOCUMENTS

| | | | |
|---|---|---|---|
| 2012/0225719 | A1 | 9/2012 | Nowozin et al. |
| 2014/0002493 | A1 | 1/2014 | Mitchell et al. |
| 2015/0161516 | A1 | 6/2015 | Ghassemzadeh et al. |
| 2016/0139575 | A1 | 5/2016 | Funes |
| 2016/0350922 | A1* | 12/2016 | Tofolo ..................... G06T 7/97 |
| 2017/0220672 | A1 | 8/2017 | Sainani et al. |
| 2017/0244991 | A1* | 8/2017 | Aggarwal .............. G06V 20/46 |
| 2017/0262064 | A1 | 9/2017 | Ofir et al. |
| 2019/0005331 | A1 | 1/2019 | Lee |
| 2019/0205651 | A1 | 7/2019 | Chang et al. |
| 2019/0368879 | A1* | 12/2019 | Roumeliotis ........... G06T 7/277 |

FOREIGN PATENT DOCUMENTS

| | | | | |
|---|---|---|---|---|
| EP | 2385497 A1 * | 9/2011 | ............... | G06T 7/20 |
| WO | 2014/066908 A1 | 5/2014 | | |
| WO | 2019217028 A1 | 11/2019 | | |
| WO | 2021/038565 A1 | 3/2021 | | |

OTHER PUBLICATIONS

Munoz-Gil, Gorka, et al. "Single trajectory characterization via machine learning." New Journal of Physics 22.1 (2020):013010.

Sahin, S. O., & Kozat, S. S. (2018). Nonuniformly sampled data processing using LSTM networks. IEEE transactions on neural networks and learning systems, 30(5), 1452-1461.

Butepage, et al., Deep representation learning for human motion prediction and classification, 2017 IEEE Conference on Computer Vision and Pattern Recognition; 2017, pp. 1591-1599.

* cited by examiner

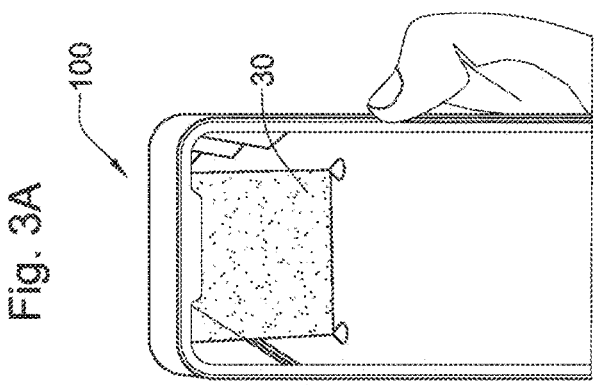
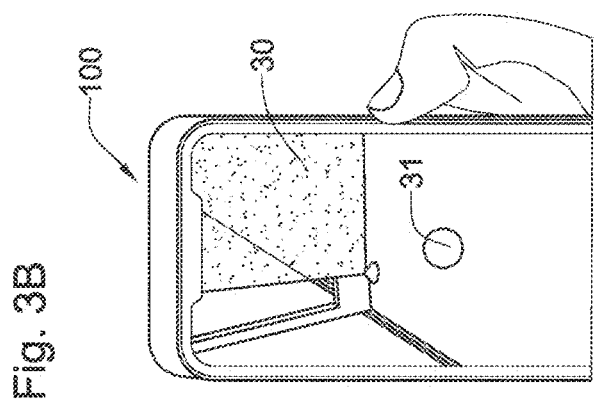
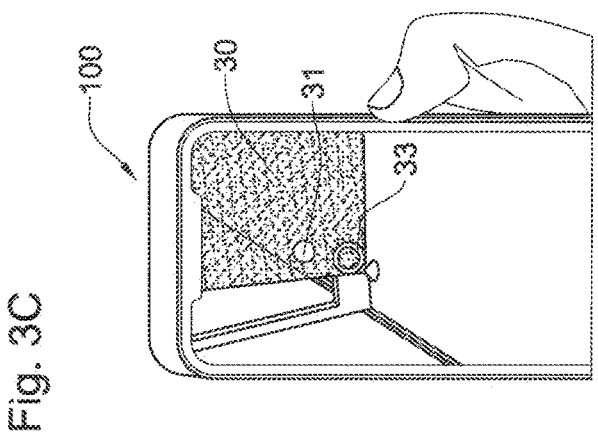

TRACKING DYNAMICS USING A COMPUTERIZED DEVICE

FIELD OF THE PRESENTLY DISCLOSED SUBJECT MATTER

The presently disclosed subject matter is related to the field of computer vision and augmented reality.

BACKGROUND

Today some computer-implemented applications are designed to identify and monitor interactions of a user with physical elements located in the real-world environment, as well as virtually generated elements. For example, some smartphone-implemented applications are designed to make use of their camera and processing capabilities to monitor interactions of a user with physical objects (e.g. a ball) located in the surrounding environment, and to provide some kind of feedback with respect to a user's performance when doing so. For instance, whether the user successfully scored a goal, where the goal can be either a physical object or a virtually generated object.

GENERAL DESCRIPTION

Examples of the presently disclosed subject matter include a system and related methods which aim at tracking user interaction with physical elements. The system includes a computerized device that comprises or is otherwise operatively connected to an imaging device and a processing circuitry, for example a smartphone or laptop computer that comprise one or more cameras.

The computerized device can be used for defining an "activity world" (or "environment"), the activity world defining an area where objects' dynamics are being monitored. The computerized device can be configured to determine the activity world as a virtual environment that corresponds to the real world physical environment, mapping user activity as well as motion of other dynamic objects in the physical world to the virtual environment, and tracking the dynamics of the user and objects. Notably, for simplicity the term "object" is used herein collectively to refer to both animate (e.g. person, animal) and inanimate objects (e.g. ball, heavy bag, bat, etc.).

This includes but is not limited to user activity such as user interaction with the environment (e.g. walking, running, jumping, etc.) and user interactions with other items in the environment (e.g. ball, stick, racket, heavy bag, etc.); dynamics of objects and their interaction with the environment (e.g. ball rolling or bouncing on the ground, etc.); and interaction of one object with another (e.g. two balls hitting, ball being hit by a racket, ball bouncing against wall, etc.). User activity includes, in some examples, complex exercises comprising a sequence of interactions with one or more objects in the environment (e.g., balls juggling, bouncing a ball on various body parts, ball dribbling, hitting a tennis ball with a racket against a wall, punching a heavy bag, etc.).

Sensors of the computerized device (e.g., camera, lidar scanner, IMU, GPS, audio) and optionally other auxiliary devices (e.g. an IMU on a smart watch) as well as inter device communication (e.g. ultrawideband precise localization) are used to capture data of the environment and relevant objects located therein. Captured images and/or other sensed data is then processed to determine the relative spatial configuration of the environment, user, and objects.

In some examples, the computerized device is further configured to recognize and measure activities and interactions of objects, analyze the performance during the activity, and provide feedback to the user in real-time during and after execution of the activity. Feedback can be, for example, acoustic or visual, and can be related for example to instructions regarding the setup of the system, regarding execution of the exercise, and user performance. In some examples, feedback can be provided to the user in real-time (or near real-time), during execution of user activity.

According to on aspect of the presently disclosed subject matter there is provided a computerized device that comprises a processing circuitry, the processing circuitry comprising at least one computer processor; the computerized device further comprises or is otherwise operatively connected to one or more sensors including at least one image sensor configured to continuously capture images of an environment;

the processing circuitry is configured to process the captured images and:
  detect an object within the environment;
  track a trajectory of movement of the object;
  select a best fitting motion model to the trajectory and determine a state of the object based on the best fitting motion model; and
  determine at least one intersection point between the object and a target object.

The device according to the above aspect, can optionally further comprise at least one or more of features (i) to (xv) listed below, in any technically possible combination or permutation.

i. wherein the processing circuitry is configured to:
  determine a plurality of location-points, each location-point is determined based on one or more detected appearances of the object in the captured images;
  determine moving object parameters;
  determine the trajectory of the moving object based on the plurality of location-points and parameters; and
  select the best fitting motion model from a plurality of available motion models.

ii. wherein the processing circuitry is further configured to:
  continuously update the trajectory of the object using additional location-points, to thereby generate an updated trajectory;
  compare the updated trajectory with a plurality of motion models to determine a best fitting motion model to the updated trajectory;
  identify a change in the state of the object, in case it is determined that a motion model that is different from the selected motion model has a best fit to the updated trajectory.

iii. wherein the processing circuitry is configured for determining the trajectory of the moving object based on the plurality of location-points and parameters, to:
  define a sliding window encompassing a sub-group of the plurality of location-points;
  shift the position of the sliding window along the plurality of location points;
  for each window position:
  determine, based on a respective sub-group of location-points in the window, a selected motion model having a best fit to a sub-section of the trajectory consisting of the sub-group of location-points; and
  assign a current state to the moving object according to the selected motion model determined for the plurality of windows.

iv. wherein the processing circuitry is configured to reapply the selected motion model on the trajectory.
v. wherein the processing circuitry is configured for determining at least one intersection point between the object and the target, to:
   estimate at least one future trajectory of the moving object at a time of intersection with the target object based on the best fitting motion model;
   and determine, for each future trajectory, a respective future intersection point between the moving object and the target object, before actual intersection between the moving object and target.
vi. wherein the processing circuitry is configured for determining at least one intersection point between the object and the target, to:
   estimate a plurality of future trajectories of the moving object at the time of intersection with the target object, thereby obtaining a plurality of candidate intersection points;
   calculate a distribution of the plurality of candidate intersection points; and determine a final intersection point if a distance of the object from the target is less than a predefined distance and a variance of the distribution is less than a predefined value.
vii. wherein the processing circuitry is further configured to detect an interaction of a user with the object, the interaction resulting in movement of the object in the environment.
viii. wherein the processing circuitry is configured to generate an activity world as a virtual environment that corresponds to the real world physical environment, the activity world defining an area where object's dynamics are being monitored.
ix. wherein the processing circuitry is further configured to define an activity area having specific boundaries within the activity world, the activity area being assigned with one or more attributes defining constraints on the manner in which an activity of the user should be performed from within the activity area.
x. wherein the processing circuitry is further configured, following detection of interaction of the user with the object, to:
   determine an area of interaction within the activity world;
   determine whether the area of interaction overlaps with a predefined activity area, and if so:
   determine whether interaction attributes comply with one or more respective attributes assigned to the predefined activity area; and
   determine level of success in performing a user activity.
xi. wherein the processing circuitry is configured to define one or more constraints on the manner in which an intersection of the object and the target of the user should occur.
xii. wherein the processing circuitry is configured, following determination of at least one intersection point between the object and the target object, to:
   determine whether the at least one intersection point complies with the one or more attributes, and determine a level of success in performing the interaction accordingly.
xiii. wherein the processing circuitry is configured to determine level of success in performing an activity by the user based on at least one intersection point.
xiv. wherein processing of the images is performed in real-time while the images are being captured.
xv. wherein the processing circuitry is configured to adapt an image sensor frame rate according to the state of the object.

According to another aspect of the presently disclosed subject matter there is provided a method of monitoring using activity in an environment using a computerized device, comprising a processing circuitry that includes or is otherwise operatively connected to at least one image sensing device; the method comprising:
   capturing images of the environment using the at least one image sensor;
   processing the captured images, comprising:
      detecting an object within the environment;
      tracking a trajectory of movement of the object;
      selecting a best fitting motion model to the trajectory and determining a state of the object based on the best fitting motion model; and
      determining at least one intersection point between the object and a target object.

According to another aspect of the presently disclosed subject matter there is provided a non-transitory computer readable storage medium tangibly embodying a program of instructions that, when executed by a computer, cause the computer to perform the method according to the previous aspect.

The method and the non-transitory computer readable storage medium disclosed herein according to various aspects, can optionally further comprise at least one or more of features (i) to (xv) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 3A-C are illustrations showing examples of a smartphone used for implementing some features of the presently disclosed subject matter;

DETAILED DESCRIPTION

Figure 1:
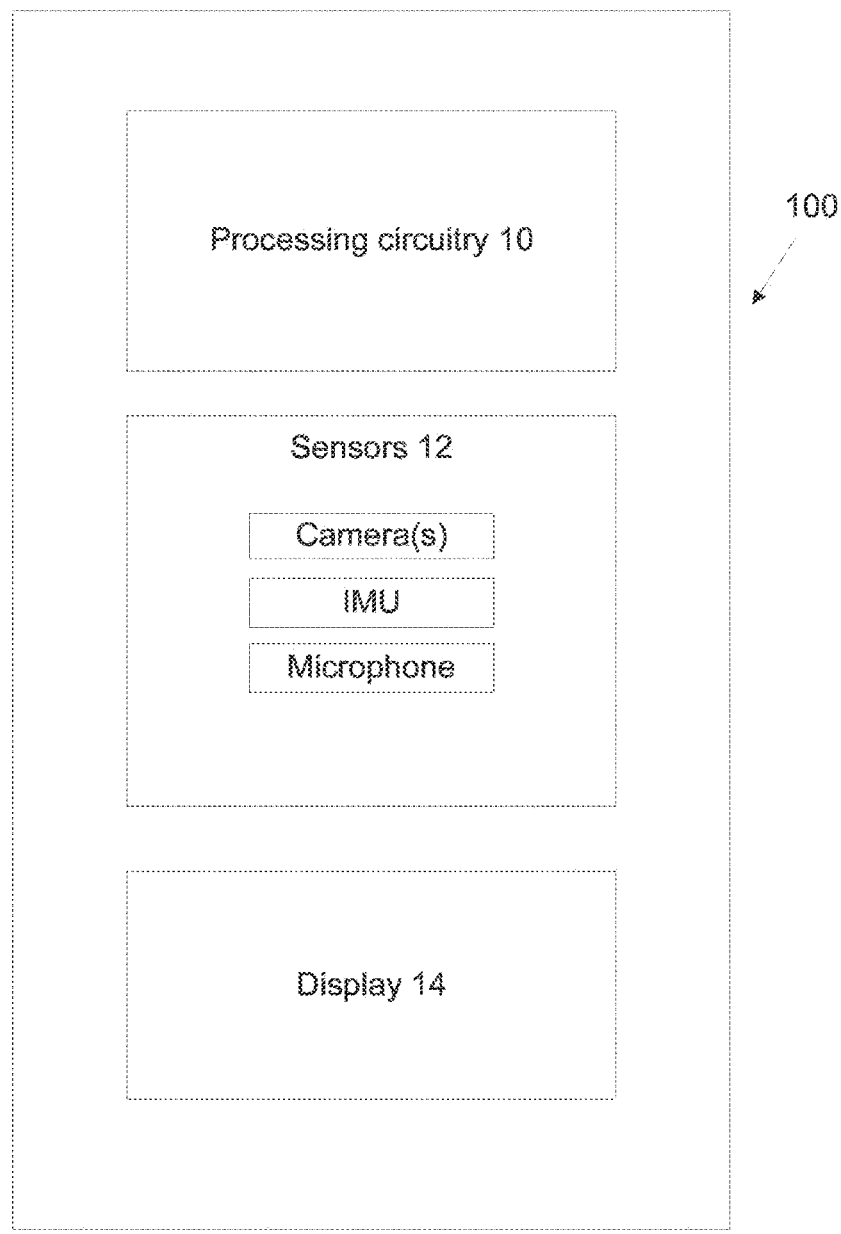
FIG. 1 is a high-level schematic block-diagram illustration of a computerized device according to examples of the presently disclosed subject matter.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "generating", "defining", "tracking", "determining", "assigning", or the like, include actions and/or processes of a computer that manipulate and/or transform data into other data, said data represented as physical quantities, e.g. such as electronic quantities, and/or said data representing the physical objects.

The terms "computer", "computer device", "computerized device" or the like as disclosed herein should be broadly construed to include any kind of electronic device with data processing circuitry, which includes (at least one) computer processing device configured to and operable to execute computer instructions stored, for example, on a computer memory being operatively connected thereto. Examples of such a device include: a digital signal processor (DSP), a microcontroller, a field programmable gate array (FPGA), an application specific integrated circuit (ASIC), a laptop computer, a personal computer, a smartphone, etc. According to examples of the presently disclosed subject matter the computerized device also includes an image acquisition device as further described below. An example of a computerized device is a smartphone, Notably, in the following description, the term "smartphone" is used by way of example only and should not be construed to limit the principles of the disclosed subject matter to smartphones alone.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
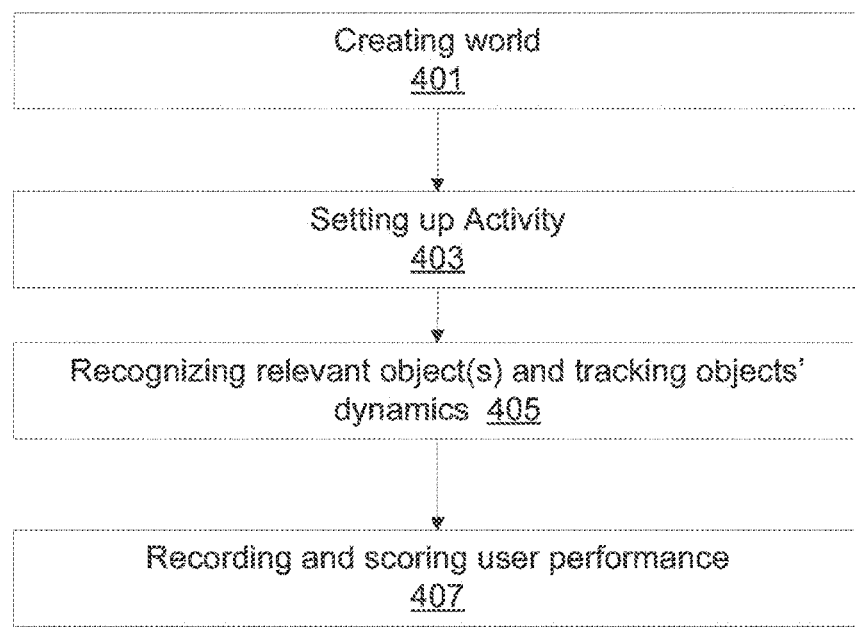
FIG. 4 is a generalized flowchart showing a sequence of operations performed by the computerized device, according to some examples of the presently disclosed subject matter.
Figure 5:
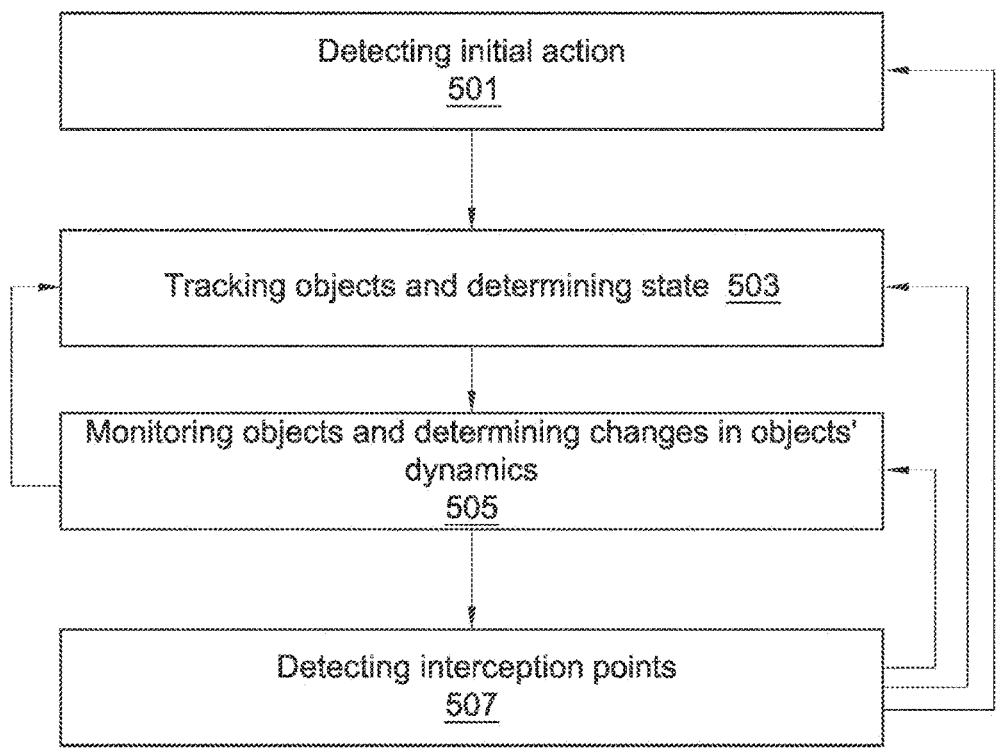
FIG. 5 is a flowchart showing operations related to object detection and tracking, according to some examples of the presently disclosed subject matter.
Figure 6:
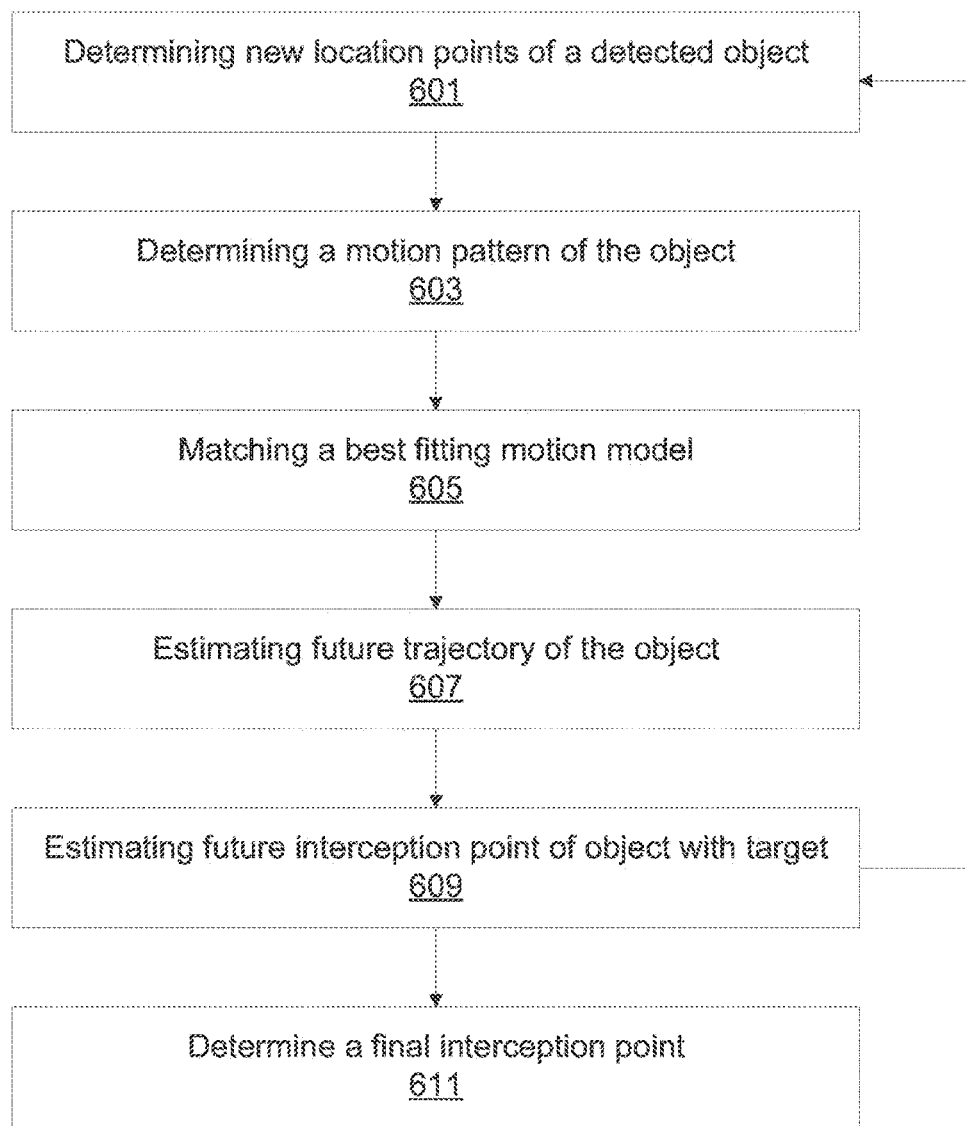
FIG. 6 is a flowchart showing operations carried out during tracking of an object, according to some examples of the presently disclosed subject matter.

In embodiments of the presently disclosed subject matter, fewer, more, and/or different stages than those shown in FIGS. 4 to 6 may be executed. In embodiments of the presently disclosed subject matter, one or more stages illustrated in FIGS. 4 to 6 may be executed in a different order and/or one or more groups of stages may be executed simultaneously.

Figure 2A:
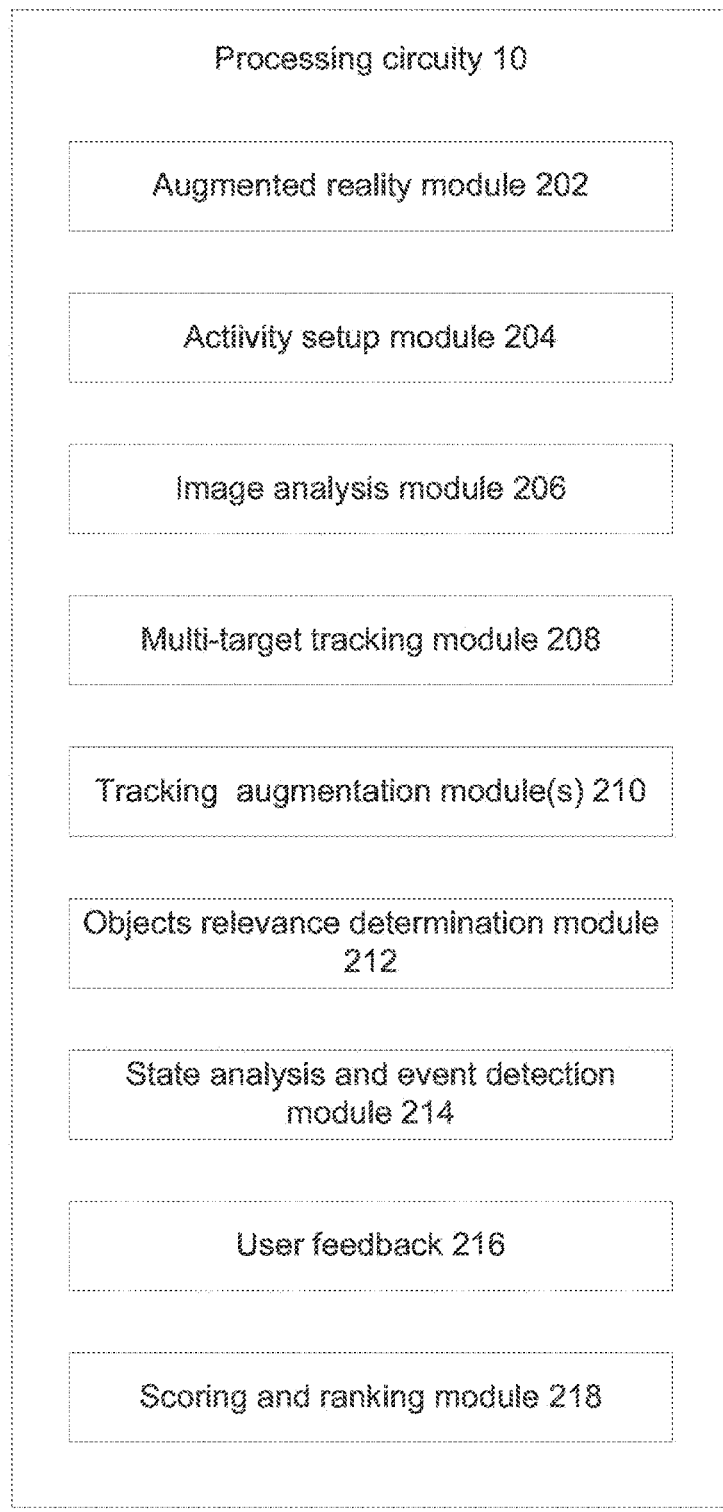
FIG. 2a is a schematic block-diagram illustration of a computer circuitry according to examples of the presently disclosed subject matter.
Figure 2B:
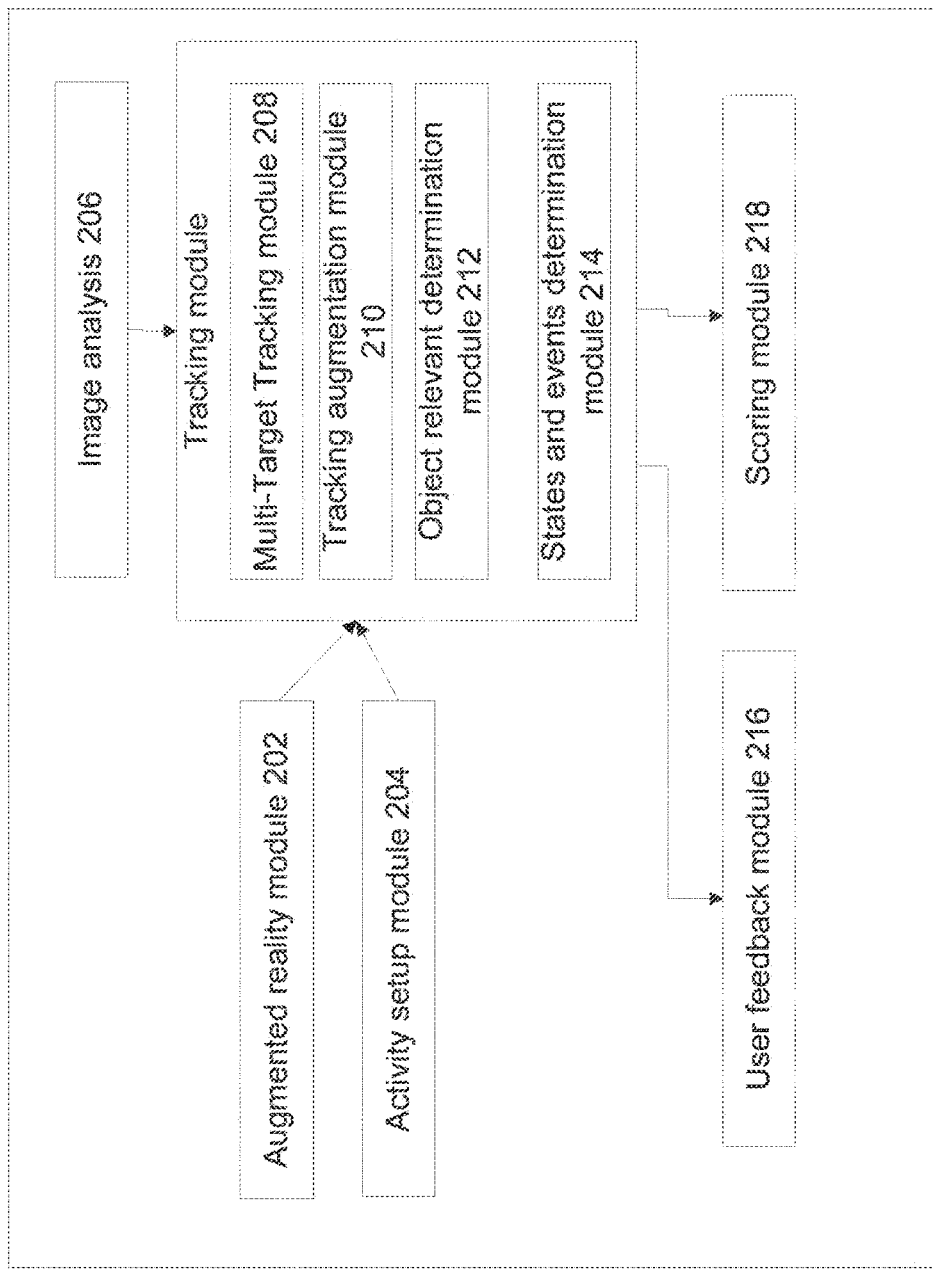
FIG. 2b is another schematic block-diagram illustration of a computer circuitry according to examples of the presently disclosed subject matter.

FIG. 1, FIG. 2a and FIG. 2b illustrate various aspects of the system architecture in accordance with some examples of the presently disclosed subject matter. Elements in FIG. 1, FIG. 2a and FIG. 2b can be made up of a combination of software and hardware and/or firmware that performs the functions as defined and explained herein. Elements in FIG. 1, FIG. 2a and FIG. 2b may be centralized in one location or dispersed over more than one location. For example, part of the modules described below with reference to FIG. 2a can be located at a remote computerized device (e.g. remote server device), where device 100 is configured to communicate with the remote device, provide to the remote device input data, and receive output data after completion of the processing at the remote device. In other examples of the presently disclosed subject matter, the system may comprise fewer, more, and/or different elements than those shown in FIG. 1, FIG. 2a and FIG. 2b.

Bearing the above in mind, attention is drawn to FIG. 1, which is a high-level schematic block-diagram illustration of a computerized device (user end device) according to examples of the presently disclosed subject matter. As shown, the computerized device comprises processing circuitry 10 operatively connected to one or more sensors 12, and a to display device 14. The sensors comprise for example: one or more cameras, one or more accelerometers, one or more gyroscopes, one or more microphones, etc. Sensors 12 can further comprise an IMU (Inertial Measurement Unit) sensors that comprises the accelerometers, gyroscopes and possibly also one or more magnetometers.

The processing circuitry 10 is configured to provide the processing necessary for executing operations as further disclosed herein below. The processing circuitry 10 comprises or is otherwise operatively connected to one or more computer processors (not shown separately) and can also comprise computer memory (not shown separately). The processor(s) of processing circuitry 10 can be configured to execute one or more functional modules in accordance with computer-readable instructions implemented on a non-transitory computer-readable memory comprised in the processing circuitry. Such functional module(s) are referred to hereinafter as comprised in the processing circuitry.

FIG. 2a is a schematic block-diagram showing some components of the processing circuitry, according to some examples of the presently disclosed subject matter. Notably, the division of the functionality into the specific modules as shown is made by way of example only and should not be construed as limiting in any way.

In some examples processing circuitry 10 includes:

Augmented reality module 202 configured to generate a virtual world representing the physical environment (also referred to herein as "activity world") that includes physical objects and possibly also virtual objects. In general, generation of a virtual world is accomplished based on data obtained from the various onboard sensors including imaging data captured by the one or more cameras. The processing circuitry 10 is configured to recognize certain features in the captured image which are suitable as placeholders for tracing relative position of objects from one image to the next along a sequence of capture images e.g. in a video stream. Based on the phone's known camera parameters (e.g. camera orientation, position, focal length, distortion, etc.), 2D and/or 3D (e.g. partial 3D) reconstruction of the scene (e.g. generating a ground plane representing the physical ground or floor), and simultaneous localization of the phone inside this virtual 3D reconstruction, can be performed. In some cases, the phone is moved during the 3D reconstruction of the environment to provide different viewing points. Methods technically disclosing the task of creating an activity world are well known in the art, and include by way of example SLAM methods (Simultaneous Localization and Mapping).

Activity (e.g. exercise) setup module 204 is configured to execute methods of setting up an exercise or physical task to be performed by a user. In some examples, this module is also configured to provide instructions to the user during a scanning phase in which the user is guided to move the phone in a certain way in order to enable the generation of the activity world by augmented reality module 202. In some examples, this module is also configured to generate and display on the display device a graphical user interface for user interaction, for example, to enable user interaction with the smartphone for placing virtual elements inside the virtual representation of the physical world. This can be done for example, by interacting with the phone's screen (e.g. by dragging and dropping) for the purpose of place elements on the ground plane determined by augmented reality module 202. In further examples, this module is also configured to generate and display various augmented reality elements such as target objects (e.g. targets to be hit with a ball by a user), virtual goals, virtual lines, virtual boards, etc.

Image analysis (processing) module 206 is configured to execute various methods (including computer vision methods) of implementing image processing on captured images for the purpose of recognizing and/or tracking relevant elements in the physical environment and facilitating mapping of physical objects to the virtual environment. Image analysis includes for example, analysis of articulated objects in 2D or 3D (e.g. humans) potentially also including their articulation (e.g. human body features, parts and posture) and other objects in 2D or 3D (e.g. ball, goal, cones, rackets). Image analysis can be based on one single video frame or on a multiple of video frames. In some examples, machine learning (including Deep Learning) methods can be used for this purpose. One example of an image analysis module task is detection of ball bounding boxes in the image stream or in a sequence of images (image stream), i.e. the area (sizes) and position of pixels in the image that correspond to the real world position of the ball (referred herein below as "location-points"). Image analysis can be combined with the operation of augmented reality module 202 to determine location and orientation of objects within the virtual environment created by module 202.

Multi-target tracking module 208 is configured to implement robust tracking of relevant objects over time in the stream of images. For example, in case multiple balls are visible within the image frame (detected for example by image analysis module 206) or other objects are falsely detected as balls, multi-target tracking module is configured to support separating between the different balls and assigning different detections and tracking of respective trajectories of each ball.

Tracking augmentation module(s) 210 is configured to apply various models for the purpose of increasing robustness of detection and tracking of relevant objects. The models include for example, motion models, appearance models and object classification models. Multi-target tracking module 208 can be configured to utilize the functionality of tracking augmentation module(s) 210 during tracking of the one or more target objects detected in the environment.

Object classification models are used for classifying detected objects, i.e. determining the type of object. For example, identifying an object as a ball and further classifying the type of the ball e.g. baseball.

Motion models are aimed at modelling the way objects are moving and predict future location of objects to improve object tracking. This is achieved at least partly by more accurately associating between detections of objects and their past detections along a sequence of captured images. Associating between objects in different detections (images) helps to construct a continuous object trajectory for a given object over time.

Appearance models use appearance features (e.g. color, shape, texture) of objects detected in the scene for improving tracking. These features can be maintained for individual objects and assist in distinguishing between similarly looking objects (for example, objects of the same class e.g. different balls) and help to enable continuous tracking of the same object and construction of a continuous object trajectory over time. Appearance models are also suitable to re-detect the same object even if it has been completely lost (e.g. has disappeared from the field of view) or is being used in a completely new session (e.g. on the next day).

For example, in case a yellow ball and a red ball are identified in the scene, color-based appearance features can be well suited to support assignment of the detections of the current frame to the detections of the previous frame, to thereby obtain a continuous assignment of the right trajectory of each ball from one frame to the next. In addition, if it is known that a specific user is using two balls with specific features, the balls can be re-detected in a different session on the next day. This might be specifically advantageous if the different balls have different physical properties (e.g. different dimensions, flight quality, etc.), which can serve as additional features for identifying each ball.

State analysis and event detection module 214 is configured to analyze data collected with respect to an object identified in the scene and identify specific states and events characterizing the object. State analysis and event detection module 214 also assists in the tracking of objects (e.g. by multi-target tracking module 208) within the activity world.

According to some examples, the term "state" as used herein includes information characterizing a prolonged condition or occurrence of an object in the activity world. For example, in case of a ball, whether the ball is rolling on the ground, bouncing on the ground, is static, is undefined, etc. In case of a user, whether the user is walking, running, standing, jumping, etc.

According to the presently disclosed subject matter, the dynamics of at least part of the states are represented by one or more corresponding motion models. A motion model of a certain state mathematically describes the motion pattern (trajectory) of an object while in the state. The values of specific parameters of the motion model define the specifics of a respective trajectory represented by the motion model.

For example, different classes of motion models include those representing a parabola like motion pattern (e.g. ball flying in the air), a straight line motion pattern (e.g. ball rolling on the ground) and a fluctuating motion pattern (e.g. ball bouncing). Each specific motion pattern can be assigned to a specific class of motion models, but it is also characterized by specific parameters that differentiate between different models in the same class. Such parameters include height, speed, acceleration, and direction vectors of the object.

According to some examples the term "event" as used herein includes a specific and in generally short lived (e.g. momentary) occurrence, referring to a period shorter than a state, characterizing the motion of an object. In one example, in a 60 frames per second video stream, an event is defined as an occurrence extending 5 frames or less. For example, moment of interaction between objects (e.g. moment of ball intersecting the goal, moment of a ball is kicked by a person, moment a heavy bag is hit by a person), transition from one state to another (e.g. person starting to run after walking, or person changing direction of advancement, ball bouncing after traveling through the air). As further explained below, events can assist in detecting a change in the state of the object.

Object relevance determination module 212 is configured to classify identified objects as relevant and non-relevant objects based on various object characteristics such as for example their respective motion pattern or their respective location/orientation relative to other elements. For example, if several balls are present in the scene, a ball being kicked towards the goal is more relevant for a shot on goal exercise than a ball being stationary in the background. The object relevance determination module is configured to determine which ball is more relevant for the upcoming task. Object relevance determination module 212 can also be used by multi-target tracking module 208 to enhance tracking of objects. Thus, while multi-target tracking module 208 is configured to track more than one target, object relevance determination module 212 is configured to identify an object which is relevant to the activity.

User feedback and guidance module 216 is configured to enable user interaction including for example by generating feedback indicating various situations and guiding the user through the task. For example, generating a specific sound when the task is successful and a different sound when the task is not successful.

Scoring and ranking module 218 is configured to apply various metrics for scoring and ranking the user performance.

FIG. 2b is another schematic block-diagram showing some components of the processing circuitry, according to some examples of the presently disclosed subject matter. While the functional elements in FIG. 2b are like those which were described above with reference to FIG. 2a, the specific layout illustrates a non-limiting example of the interoperability between the components. For example, a tracking module was added which includes the components which are take part in the tracking process of an object detected in the environment. In addition, augmented reality module 202 and Activity setup module, which have a function in setting up the environment for an activity, are illustrated externally to the Tracking module. Likewise, user feedback module and scoring analysis module, which analyze user performance based on the tracking output, are illustrated below the Tracking module.

Attention is now turned to the description of FIG. 4 showing a sequence of operations according to some examples of the presently disclosed subject matter. Operations described with reference to FIG. 4 (as well as FIGS. 5 and 6 below) can be executed for example, by computerized device 100 and more specifically one that comprises processing circuitry 10 as described above. It should be appreciated, that while some operations are described with reference to processing circuitry 10 and its components as presented above with reference to FIG. 2a, this is done by way of example only, and should not be construed to limit the operations to being implemented by a device having that specific design.

In some examples, an "activity world" is imported or loaded, e.g. from a previous session. In other examples, an "activity world" is created as an initial step (block 401). As mentioned above, the activity world is a virtual representation of the physical environment or area where an activity is intended to occur. During creation of the activity world the environment in which the activity is intended to occur is scanned using the computerized device to thereby establish a virtual world coordinate system. This can be accomplished with the help of augmented reality module 202. For example, a user can scan the surrounding area using an appropriate sensor (e.g. video camera or depth camera such as a lidar scanner) in his smartphone and the location of the phone relative to the scanned environment is determined based on camera and/or IMU data and used for creating a world with a consistent coordinate system with respect to the camera and all elements that are recognized in the environment.

As mentioned above, augmented reality module 202 is configured, inter alia, to map real world elements to a virtual representation of the real world, as well as mapping virtual elements to the real-world environment. For example, a virtual ground plane representing the ground is determined based on recognizable features in the scanned environment. If the smartphone is moved, the mapping of the virtual world is continuously calculated to continuously maintain the position of the smartphone relative to the virtual world.

At block 403 an activity is set up. An activity (e.g. exercise) can be set up by placing virtual objects within the activity world. According to one example an "activity" can include one or more physical actions performed by the user. Some principles of operations are described herein in conjunction with a specific example of shooting a ball to a goal. However, this should not be construed as limiting in any way, and the same principle can be applied to various other activities.

Several examples of activities are listed below:

An activity that involves dribbling and bouncing the ball (like in basketball) while a computerized device (e.g. Smartphone) is placed in front of the user viewing the user. Optionally this is done using the front camera so that user can see results in real-time. User performance can be ranked, for example, according to the number of times the ball hits the ground and the frequency of the dribbling. In addition, virtual items can be placed on the ground (by displaying the items on the display device) where the user is instructed to hit these items while dribbling and is scored according to the success to do so.

An activity that involves dribbling around virtual objects, either with phone in hand or while phone is placed in front of the user viewing the user and overall scene.

An activity that involves that involves shooting a ball to a target, rather than a goal, e.g. a target marked on a wall.

An activity that involves that includes hitting moving targets, either in a goal or anywhere in the activity world. The user is scored according to his success to hit the moving targets.

Assuming the intended activity is kicking a ball into a goal, during setup a goal, marking a target for aiming the ball, is placed in the activity world. This can be done for example by the user touching a relevant location of a screen of a smartphone displaying camera images, to mark correct placement of a virtual goal in the environment. Alternatively, a real goal can be recognized by a computer vision algorithm applied on images captured by the camera of computerized device 100 (e.g. by image analysis module 206), and a virtual goal can be generated (automatically or in response to a user command) by the processing circuitry 10 (e.g. by exercise setup module 204) based on the actual location of the physical goal e.g. a virtual goal that virtually represents the physical goal.

FIG. 3A is an image of a smartphone used for placing a virtual goal 30, According to this example, a virtual goal defines specific boundaries where the ball should pass to score, i.e. scoring occurs when the ball intersects the virtual goal.

Furthermore, other virtual areas can be added in addition to, or instead of, a goal. For example, one or more activity areas can be defined, each activity area being assigned with respective activity attributes that define specific constraints on performing an activity over or in that area. Attributes of activity areas can include for example:

specific class of activities—certain activities that can be performed only from specific activity areas or certain activities that cannot be performed from specific activity areas;

specific constraints and/or requirements on the activities' metrics, for example: minimal/maximal speed of performing a certain activity to be considered a valid activity e.g. speed of kicking a ball; minimal/maximal height related to performing an activity to be considered a valid activity e.g. height of ball trajectory; frequency of the activity e.g. number of actions in a given time frame when the activity is repetitive; direction of the movement of an object, e.g. direction in which a ball is kicked.

One example of an activity area is an area from which an activity should start, e.g. a certain (planar or volumetric) region(s) on the ground within the activity world from which object trajectories towards the target object should start, where movement of the object is considered valid only if the initial action occurred within the boundaries of this area. One such activity area is a shoot-off area, where trajectories of a ball towards a goal are considered valid only when starting from this area. In further examples, the shoot-off area may also have further attributes, e.g. requires that the ball is moved at a speed greater than a certain minimal speed or from a certain minimal distance/angle relative to the goal in order to be considered a valid shot.

Another example of an activity area is the entire activity world in which the activity is taking place, where any activity within the environment should comply with certain constraints to be considered valid.

As further explained below the virtual representation of the object helps to track objects and detect performance of the user more accurately. For example, where an appropriate physical goal is not available, many times other objects are used instead. For example, two objects (e.g. two shoes) may be placed on the ground to mark the sides of an imaginary goal. In such cases, during play it is often not clear whether a ball shot at the goal has passed within the intended boundaries of the goal or not. For example, when a ball is kicked it is often unclear whether the trajectory of the ball is actually between the goal limits and within the allowed height of the goal, or whether it is outside these boundaries, and therefore an 'out'. By placing a virtual goal that defines the boundaries of the goal, and by tracking the ball while being kicked to the goal, the disclosed system and method is capable of determining whether the ball has been kicked within boundaries of the goal or not, even when a physical goal is not available.

Processing circuitry 10 can be configured to analyze activities and determine level of success of the activity (e.g. whether or not the activity/interaction is considered valid), depending on the specific activity area from which it was executed and the respective activity attributes (e.g. interaction attributes) of that area. As the activity area is a virtual area defined in the virtual representation of the world, this can be accomplished using the virtual representation of the world, and its respective coordinate system (as generated for example by the augmented reality module 202).

The activity world is being continuously monitored using one or more sensors (e.g. smartphone cameras) to identify objects. At block 405, one or more objects are recognized and identified in the images captured by the device's camera, and any relevant object is tracked while moving within the activity world. These operations can be performed, for example, with the help of image analysis module 206, multi-target tracking module 208, object recognition module 212, tracking augmentation module 210, and state analysis and event detection module 214. FIG. 3B is an image of a smartphone used for identifying a ball 31 and creating a 3D virtual representation of the ball on the screen.

As further explained below according to some examples, objects identified in the captured images are processed and respective location-points (also referred to herein as "points" in short) are determined indicating their location in the activity world. Detected objects can be transformed to the same virtual representation (to the same coordinate system) of the activity world as the activity area. This can be done using image processing, the smartphone location and orientation, as well as other parameters, as is well known in the art. Compliance with the specific requirements and/or constrains of a specific activity area can then be determined by analyzing the activity, extracting the relevant data, and comparing the data to the required performance.

In some examples a three dimensional (3D) virtual object is generated, based on 2D information obtained from the camera and the estimated size and the corresponding pixel size. This can be accomplished by solving an inverse 3D projection of the object on the image plane of the camera, using information including the dimensions of objects and the known parameters of the camera (e.g. camera orientation, position, focal length, distortion, etc.), as is well known in the art.

According to examples of the presently disclosed subject matter, as part of the object tracking and analysis, a state of the object is determined, and one or more meaningful events are detected (e.g. with the help of state analysis and event detection module 214). As mentioned above, meaningful events include significant short-lived occurrences related to the object's movement. Such events include for example, intersection of an object with another object, and sudden change in the object's trajectory (e.g. transition from bouncing to rolling). In the example of a ball game, such events include: kicking the ball toward the goal (moment of interaction of a person's foot with the ball, causing sudden acceleration of the ball) and moment of intersection of the ball with a goal. Another example is a ball bouncing off the ground, where each bounce is an event that causes a significant change in the direction of the ball.

FIG. 3c is an image of a smartphone showing ball 30 intersecting a virtual goal. The point of intersection is indicated by circle 33. Notably, some type of indication can be generated when the ball passes (or misses) the area of the goal. For example, processing circuitry 10 can be configured to generate a distinctive sound or speech that indicates success, and a different sound or speech that indicates failure. Likewise, the color of the virtual goal, as displayed on the display device, can be modified to a difference color according to failure/success to score a goal.

Performance of the user can be recorded and scored (block 407). For example, each shot can be analyzed according to various performance metrics relevant for the exercise, such as shot speed, accuracy etc. Result metrics can be shown to the user during or after the exercise. The performance metrics can further be combined and weighted in a certain way to obtain a score.

The presently disclosed subject matter enables to apply various modifications to different exercises. For example, in case of a ball being thrown or kicked towards a target (e.g. goal) the target object can be split into different sub-areas. This provides various possibilities for conducting exercise. For example, the computerized device 100 can be configured to provide the user with specific instructions (e.g. audio instructions) to hit specific sub-areas of the goal, where hitting the correct sub-area would grant the user with a higher score. In another example, the size of the goal can be adapted either as part of a predefined exercise (e.g. reducing the size of the goal in order to continuously increase the difficultly level of the task) or in response to a request of the user.

Similar to activity areas discussed above, a target object can also be assigned with attributes ("intersecting attributes") defining specific constraints on the manner in which intersection between the moving object and target object should occur. For example, hitting a specific part of a virtual goal would grant the user with a higher score than hitting other parts. The area of intersection is analyzed to determine whether object dynamics comply with the intersecting attributes of the target object, to determine level of success of the performance e.g. determine whether the activity is valid.

The presently disclosed subject matter can be used in various activities. For example, an activity that involves a slalom drill, requiring a user to dribble a ball around several virtual cones, or a ball juggling activity. This is done by analyzing ball movement in relation to location of body parts (e.g., knees, head, feet). Other examples include performing a certain task (e.g. throwing a ball to a target) within a certain time frame, and determining performance.

As explained above, according to the presently disclosed subject matter, objects are identified in an activity world and are tracked to detect motion and interaction between objects (both physical and virtual, e.g. person and ball, and ball and a virtual goal).

The presently disclosed subject matter includes a method for enabling robust tracking of objects and detection of interaction between physical and virtual objects. A more detailed description of the specific tracking method is disclosed herein below.

As demonstrated above with respect to FIGS. 3A to 3C, a scene can contain one or more virtual target objects (e.g. a rectangular planar region describing a goal or gate). The virtual objects may represent physical objects which are present in the environment, but this is not always necessary, and, in some cases, may be completely virtual. Target objects are in general stationary, but this is not always the case and in some cases the target object can move relative to the ball.

The scene can also contain one or more physical objects which are moveable by a user (e.g. a ball that can be thrown or kicked toward a target object such as a goal). Movement of the physical objects through the environment is tracked, and interaction between the target object and the physical object is detected.

According to some examples of the presently disclosed subject matter, the trajectory of a moving object is compared to one or more motion models describing the movement of the physical object (e.g. a parabola fit for a ball moving in the air, or a line fit for a ball rolling on the ground). During comparison motion models can be obtained, for example, from a computer data-repository (implemented using some type of computer memory device) in device 100.

FIG. 5 is a flowchart showing operations related to recognition and tracking of an object's movement, according to some examples of the presently disclosed subject matter. The description of FIG. 5 provides further explanations of operations mentioned above with reference to FIG. 4 and in particular those described with reference to blocks 405 and 407. Notably, while described as a sequential process, the operations in FIG. 5 can be executed in parallel or in a different order. As before, some principles of operation are described in conjunction with a specific example of shooting a ball to a goal.

As described above with reference to block 405 the activity world is continuously monitored using one or more sensors (e.g. smartphone cameras), and objects present in the activity world are identified. Optionally, in some examples, a detection of an initial action is performed (block 501). The initial action can include an interaction of the user with a physical object that is located within the activity world. For example, in case of a ball being kicked or thrown toward a target such as a goal, the shoot-off of the ball is initially detected. Detection can be performed using one or more cameras e.g. by the image analysis module as described above. Images captured by the camera of device 100 are processed in order to recognize and identify objects in the scene (e.g. a person and a ball) and determine their relative location in the activity world. In some examples, machine learning algorithms are applied on the captured images (e.g. by image analysis module 206) for this purpose.

As mentioned above, one or more activity areas, defining specific constraints on the manner an activity is performed to be considered valid, can be defined. For example, an area from which an activity should start (e.g. shoot-off area) can be predefined, where movement of the object is considered valid only if the initial action occurred within the boundaries of this area. The area of interaction (the area in the activity world where interaction of the user with the object has been detected) is analyzed to determine whether it overlaps with an activity area, and whether the users' actions comply with the constraints of the activity area. The activity is monitored to determine level of success of the performance e.g. determine whether the activity is valid. For example, speed and direction of object's movement can be determined and compared with the required speed and direction as prescribed by the interaction attributes of the activity area.

In the example of a shoot-off area, the proximity of the object (e.g. ball) to the shoot-off area is continuously estimated, and only if the object is determined to be within the allowed distance from this area (e.g. inside the boundaries of the area) during the initial action, the action is determined as valid.

According to other examples, detection of an initial action is not necessary. For example, while monitoring the activity world with the camera, a ball can be kicked outside the camera's frame and enter the frame afterwards, while the camera captures the ball but not the actual kick. In such cases, instead of an initial action that includes interaction of a user with the ball, the initial action may be entry of the ball into the camera's frame.

To increase robustness of the analysis of certain events after an event is identified, further data concerning that event can be analyzed to further refine the event itself or metrics describing the event. For example, following detection of an initial interaction (ball being kicked) or detection that a ball has entered the camera's frame, the trajectory of the ball is determined and the location of the shoot-off is estimated by backtracking along the trajectory to the location of the shoot-off. This helps to validate proper placement of the ball during the initial action, even in case the actual initial interaction (e.g. shoot-off event) is not detected.

In some cases, where the initiation of the movement of the object does not take place from an activity area (e.g. no shoot-off area is defined), detection of the initial action (e.g. shoot-off event) can be continuously monitored, independent of the location of the action.

The detected object is tracked, and its motion is continuously analyzed, and the object's state is determined (block 503; e.g. by modules 210 and 214). As mentioned above, objects identified in the captured images are processed and respective location-points (also referred to herein as "points" in short) are determined. The location-points of an object are determined based on the position of appearance of the object in the captured images, where the appearance in a captured image can be translated to a respective location-point in the activity world. In some examples, each location-point can be determined using information gathered from more than one image, e.g. by calculating a respective value representing the location of the object in the plurality of images. Location-points can be 2D or 3D location-points. From the continuously detected location-points, the motion pattern of a moving object can be determined.

As explained above, in some examples motion models are applied to enhance motion detection and tracking of objects. According to some examples, several motion models are used, each model representing a certain motion pattern of a certain class (type) of motion. As the object is being tracked, imaging samples of the object are used for creating a representation of the actual motion pattern. For example, a ball is detected along a sequence of images and its motion is identified, and a corresponding motion pattern is determined. In some examples, the motion pattern is compared to a plurality of motion models, and the motion model that best fits the actual motion pattern is selected. Based on the selected motion model and its specific parameters (e.g. speed, direction, amplitude, etc.) a state of the object is determined. For example, a parabola motion model implies a "ball in air" state and a line motion model implies a "ball rolling on ground state". Fitting a motion model to the actual recorded motion pattern can be carried out using optimization techniques which are well known in the art (e.g. polynomial optimization). According to some examples the motion model can include an outlier rejection method (e.g. using RANSAC) or a weighting scheme for inliers.

By assigning a motion model that best fits the motion pattern of a moving object, object tracking is enhanced, as advancement of the object is expected to follow a motion pattern as prescribed by the fitted motion model. Furthermore, as explained below, the motion model helps in predicting the future trajectory of the object, information that can help for example in determining success in completing an activity.

In the example of a ball motion, a model for a parabola fit, as well as a model for line fit, are provided and are continuously compared with actual motion pattern of the object, as gleaned from the captured images, to determine which model is better describing the current motion of the ball. In addition to the motion model class (e.g. parabola or line) the specific parameters of the ball's motion pattern are also used for determining a specific parametrized motion model representing the specific motion pattern. This allows to determine the current state of the ball (e.g. rolling or in the air), as well as the details of the state e.g. speed of movement, height of bounces, direction of movement, etc.

In one example, the fitting a motion model is executed as follows:

Two location-points are selected randomly from a sequence of detected location-points along the trajectory of a moving object, where each location-point is assigned with a respective timestamp. Based on the locations and the timestamps, a candidate parabola can be fitted through the two points by assuming a constant gravity of 1 G in the direction of the ground and a slight deceleration due to air friction. Direction of the ground can be determined by the phone sensors (e.g. by combining accelerometer data with gyroscope data). After fitting of the two initial location-points to estimate a candidate parabola, additional location-points are fitted to the candidate parabola, e.g. location points situated between the two initially fitted location-points. An approximation of the distance of the entire collection of location-points to the estimated parabola is made, and a score of the match between the candidate parabola and location-points is calculated (e.g. based on the average distance of the location-points from the parabola line). This can be repeated, each time with a different set of location-points and estimated candidate parabola. This process can further be optimized using numerical methods and adjusting the parabola based on more than two sample points. A candidate parabola assigned with the best score can be selected as the motion model of the object motion pattern.

In some examples, a line fitting motion model can be also applied, for example a motion model that omits the gravity factor and instead adds a greater deceleration component assuming more friction due to contact with the ground. A score can be calculated in a similar manner to this model as well. Once the two types of motion models have been calculated, the respective scores can be compared and the motion model that better fits the trajectory is selected, based on the scores.

As mentioned above, according to the presently disclosed subject matter various methods may be applied for augmenting the tracking of objects along a sequence of images. For example, a multi-target tracking can be applied (e.g. with the help of multi-target tracking module 208) to enable tracking several objects and further reducing outliers by eliminating objects which are not relevant (e.g. a picture of a ball hanging on the wall, which shows no motion; e.g. using object relevance determination module 210).

Also, during object tracking, inaccuracies of the 3D estimation of the tracked object can be modeled with respect to the camera orientation axes. For example, assuming the camera of the computerized device is positioned while pointing substantially in the direction of the target object (e.g. goal) viewing the mobile object (e.g. ball) from the back while it advances towards the target object, the pixel coordinates in the captured images of the moving object from the 2D perspective (the X, Y surface plane of the object) are likely to be more accurate than the object size in pixels representing the depth of the object (the Z axis). Therefore, it can be assumed, according to some examples, that the 3D information of the object (e.g. location in the environment) is less accurate along the Z axis than along the other two axes. Accordingly, updates of location coordinates pertaining to the depth of the object can be assigned with lower weights than those assigned to updates of location coordinates pertaining to the other axes, thereby reducing the influence of inaccuracies in these pixels. This can be done for example by the tracking augmentation module 210.

In addition, determination of the state of the object (e.g, ball) can further be enhanced by thresholding on certain parameters of the motion model(s), e.g. if the speed of the ball is determined to be very low (below some minimal threshold value), or for some time the ball is determined to be stationary. A hysteresis thresholding method can be used to make the state estimation more robust to noise.

Following determination of the state of the object (or objects), the motion pattern of the object is continued to be monitored in order to identify changes in the motion pattern (block 505). A change in the motion pattern can be determined by identifying a motion model that better fits the current motion pattern of the object. A change in the best fitting type of motion model or a significant change in the parameters of a motion model of the same type, provides an indication of a change in the state of the object.

To this end, the motion pattern (trajectory) of an object can be continuously matched to different motion models. In case a change in the best fitting motion model is identified, a change in the state of the object is determined. For example, when a ball is rolled on an elevated platform such as a table, a first line fitting motion model could best represent its motion pattern. When the ball rolls off the platform into the air, and then starts bouncing off the ground, a sudden change in the motion pattern occurs and a second motion model of a (parameterized) parabolic motion model best represents its motion pattern.

Furthermore, by tracking the object and continuously monitoring its motion pattern, meaningful events can be detected and help in the detection of changes in the state of an object. For example, the moment a stationary ball is kicked and starts moving in a certain direction is a meaningful event that indicates a change in state. Considering another example, when a ball is kicked and travels through the air, a certain (parameterized) parabolic motion model could best represent its motion pattern. When the same ball hits the ground and starts bouncing, a sudden change in the motion pattern occurs. During each bounce, the ball assumes a parabola like motion pattern, however each time the ball hits the ground it changes direction completely and starts a new parabola. According to some examples this abrupt change in direction of the ball is identified as a meaningful event and is followed by fitting a different motion model to the motion pattern. A best fitting motion model can be repeatedly matched to the ball's motion pattern as it continues to bounce at an ever-decreasing height, as more energy dissipates from the ball, until it rolls on the ground and a line motion model is fitted.

According to some examples, a Kalman filter can be used for the detection of events, by incrementally applying the Kalman filter on the trajectory (e.g. location-points) and determining changes of the Kalman filter parameters over time.

According to some examples, for a more robust tracking of the object's state, as the object advances along its trajectory, the trajectory is divided into sub-sections and each sub-section is analyzed in order to determine a best fitted parameterized motion model for that sub-section, Sub-sections can be combined, after being analyzed individually, to determine a longer trajectory of the object that is consistent with a certain motion model.

According to some examples, a sliding window analysis is used, where the window encompasses a certain number of location-points along the trajectory of the object. As mentioned above, each point corresponds to a position of appearance of the object in one or more respective captured images, where the appearance in a captured image can be translated to a respective location-point in the activity world (based on the common coordinate system). Assuming each window comprises N points (e.g. N=10), a sub-section of the trajectory is defined within the window encompassing N points. The sub-section has certain trajectory characteristics, including qualitative features (e.g. rolling on the ground, stationary, travelling through the air, etc.) and quantitative parameters (e.g. direction, speed, height, acceleration, etc.). The best fitting motion model is indicative of the qualitative features of the motion pattern and the specific parameters of the model provide the quantity parameters of the motion pattern.

The sub-section of a trajectory within each window can be continuously compared, and in case a difference in the best fitting motion model between consecutive sub-sections that exceeds a certain threshold is detected, the occurrence of an event is identified. For example, in case a parabola motion model best fits the sub-sections along a certain interval of detection (encompassing a number of sliding windows) and the motion pattern in one or more consecutive sliding windows is changed, this can be identified by finding a better fit to a motion model different from a parabola.

By modeling the states and events, the motion model can provide richer information on the trajectory and predict future motion of the object. It is assumed that the trajectory of the object within a time interval up until a significant event is detected, is characterized by a consistent motion pattern. Accordingly, following determination of an event, the fitting of a motion model can be re-applied on a collection of past sub-sections (windows), analyzed within a time interval e.g. between two detected events, to thereby enhance determination and prediction of the object's trajectory.

For example, as explained above, in case of a ball bouncing on the ground, each bounce starts a parabola motion with a first impact of the ball on the ground, which ends with a second impact of the ball on the ground, assuming M location-points are detected along the trajectory extending between two impacts, a sliding window encompassing N location-points (N<M) is shifted along the trajectory and a respective motion model (e.g. of a parabola) is fitted to each sub-section of the trajectory, consisting of N points captured within the window. During each trajectory between impacts of parabola motion, while the ball is traveling in the air, it is expected that the best fitted motion model will remain the same (or sufficiently similar), as each sub-section is part of the same parabola motion. However, once the second impact occurs, and the ball hits the ground, a significant change in the best fitted motion model will be detected. According to some examples, once such a change in the best fitting motion model is determined, a motion model fitting is re-applied on the entire collection of location-points constructing the entire parabola comprising the M location points, between the two impacts.

In another example, rather than using a sliding window, a single window (referred to below as "additive approach") can be used, where newer location-points are added to the window as they appear. Thus, as newer location points are added, the motion model is fitted over an ever-increasing subsection of the parabola, continuously improving the result of the matching as more location-points become available.

A sliding window approach, as well as an additive approach, allows to process data gathered over a shorter period and therefore enables an on-line approach where data is continuously gathered in real-time or near real-time as the object is moving, and the determination and prediction is performed based on partially gathered data. In addition, re-applying of the fitting enables to obtain a more accurate determination (e.g. of an intersection point) once the full set of data is available.

As mentioned above, meaningful events include intersection of one object with another object e.g. a physical object with another virtual object (possibly representing a respective physical object). At block 507 an intersection point between objects in the environment is detected. The selected motion model (fitted to the current motion pattern of the object) can be used for extrapolating the future object trajectory in the direction of the target. Notably, it is advantageous to determine events as early as possible, as this allows to provide real-time or near real-time feedback to the user and to improve the accuracy of prediction as the motion evolves, therefore prediction of a future trajectory, and more specifically prediction of an interaction point, is desired. The estimated future trajectory can be used for estimating an intersecting point between the object and the target object (e.g. trajectory of a ball intersecting a goal). In some examples in case the trajectory of the moving object completely misses the target object, a "null" intersection point can be determined.

The intersection with the target object can be repeatedly estimated (e.g. along the entire activity) based on the last detections of a consistent motion pattern (e.g. along a plurality of sub-sections) and the estimated future trajectories. For intersection estimation, a distribution of the estimated (future) intersection points can be analyzed and used for example for checking for low variance of the distribution, where a final intersection point can be determined if the variance is below a certain value. For example, assuming for each new location-point (or for every n new location-points) of a tracked object, a respective motion model is fitted, followed by an estimation of a future trajectory and a respective intersection point of the future trajectory and the target (e.g. intersection of ball and goal) according to the fitted motion model, following which the variance of the distribution of a collection of estimated intersection points is calculated. In some examples, determination of the final intersection point is made when the distance of the object from the target object is sufficiently short (the distance of the moving object from the target object is determined to be less than a certain maximal distance) and the variance between different estimated intersection points is low (below a certain threshold value). In some cases, a minimal number of estimated intersection points is also required.

The intersection point between the trajectory of the moving object and the target object is determined based on the predicted trajectory of the moving object at that point in time. In some cases, where both objects are moving, e.g. the goal is also moving, the trajectory of both objects is estimated. Since, according to this approach, detection of the intersection is based on prediction, and is not dependent on identification of the actual intersection point, it enables detection of intersection which is independent of the structure of any physical object that serves as the target or any object that is located near it, e.g. whether it is an open door, a goal frame or a wall that is used as goal.

For example, in case a goal is placed on the wall, scoring the ball does not pass through the goal, but rather bounces back from the wall. By predicting the intersection point with a virtual goal projected on the wall it is possible to detect scoring before the actual moment of impact with the wall when the ball bounces back and complicates the detection.

According to some examples, the process described above with reference to FIGS. 4 and 5 includes internal feedback loops where the result of certain operations affects the manner of execution of the process.

In one example, the specific state that is detected may affect the operation of the system. For instance, determining that the object's state is static, may cause the processing circuitry to generate instructions dedicated to reducing the camera frame rate and/or sampling rate to preserve battery power. On the other hand, if the object is in a static state and a different motion state is determined, instructions dedicated to increasing the camera frame rate and/or sampling rate may be generated to enable high precision tracking of the object.

FIG. 6 is a flowchart of operations carried out for the purpose of prediction of an intersection point, according to examples of the presently disclosed subject matter. Principles described with reference to FIG. 6 have been described above and are mentioned here again for better clarity. Operation described below can be applied on one or more identified objects, e.g. depending on the number of objects that were identified as relevant.

At block 601, following recognition and detection of an object, new location-points of the objects are determined. Based on the location-points of the object, a motion pattern (trajectory) of the object is determined (block 603). A best fitting motion model is matched to the motion pattern and a state of the object is determined according to the best fitting motion model (605). A respective estimated future trajectory of the object is determined based on the characteristics of the motion model (block 607) and a respective estimated intersection point of the object with the target object is determined based on the estimated future trajectory (block 609). Over time, a collection of estimated intersection points is obtained.

Operations described with respect to blocks 601 to 609 are repeated as the object moves and new location-points are determined. When certain conditions are met, e.g. the object is located at a distance from the target object which is smaller than a certain threshold value and the variance of distribution of the plurality of intersection points is less than a certain threshold value, a final intersection point is determined. As explained above, in case of sliding window approach, the motion model fitting can be re-applied on the entire trajectory to determine a final intersection point.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized device comprising a processing circuitry, the processing circuitry comprising at least one computer processor; the computerized device further comprises or is otherwise operatively connected to one or more sensors including at least one camera configured to continuously capture images of an environment;

the processing circuitry is configured to process the captured images and:

detect an object moving within the environment;

determine a plurality of location-points, each location-point is determined based on one or more detected appearances of the object in the captured images;

determine object parameters;

determine a trajectory of movement of the object, based on the plurality of location-points and parameters;

select a best fitting motion model to the trajectory from a plurality of available motion models, and determine a state of the object based on the best fitting motion model;

determine at least one intersection point between the object and a target object, generate an activity world as a virtual environment that corresponds to the environment, define an activity area having specific boundaries within the activity world, the activity area being assigned with one or more attributes defining one or more constraints on a manner in which an activity of a user should be performed, detect based on the at least one intersection point an interaction of the user with the object, following detection of interaction of the user with the object:

determining an area of interaction within the activity world;

determining whether the area of interaction overlaps with the activity area, and if so:

determining whether one or more interaction attributes comply with the one or more attributes assigned to the activity area; and determining a level of success in performing the activity of the user.

2. The computerized device of claim 1, wherein the processing circuitry is further configured to:

continuously update the trajectory of the moving object, using additional location-points, to thereby generate an updated trajectory;

compare the updated trajectory with a plurality of motion models to determine a best fitting motion model to the updated trajectory;

identify a change in the state of the object, in case it is determined that a motion model that is different from the selected motion model has a best fit to the updated trajectory.

3. The computerized device of claim 1, wherein the processing circuitry is configured for determining the trajectory of the object based on the plurality of location-points and parameters, to:

define a sliding window encompassing a sub-group of the plurality of location-points;

shift the position of the sliding window along the plurality of location points; for each window position:

determine, based on a respective sub-group of location-points in the window, a selected motion model having a best fit to a sub-section of the trajectory consisting of the sub-group of location-points;

assign a current state to the object according to the selected motion model determined for the plurality of windows.

4. The computerized device of claim 1, wherein the processing circuitry is configured to reapply the selected motion model on the trajectory.

5. The computerized device of claim 1, wherein the processing circuitry is configured for determining the at least one intersection point between the object and the target object, to:

estimate a plurality of future trajectories of the moving object at time of intersection with the target object, thereby obtaining a plurality of candidate intersection points;

calculate a distribution of the plurality of candidate intersection points; and determine a final intersection point if a distance of the object from the target object is less than a predefined distance and a variance of the distribution is less than a predefined value.

6. The computerized device of claim 1, wherein the processing circuitry is configured, following determination of the at least one intersection point between the object and the target object, to:

determine whether the at least one intersection point, complies with the one or more attributes and determine a level of success in performing the interaction accordingly.

7. The computerized device of claim 1, wherein processing of the images is performed in real-time while the images are being captured.

8. The computerized device of claim 1, wherein the processing circuitry is configured to adapt a camera frame rate according to the state of the object.

9. A method of monitoring using activity in an environment using a computerized device, comprising a processing circuitry that includes or is otherwise operatively connected to at least one image sensing device; the method comprising:

capturing images of the environment using the at least one image sensing device;

processing the captured images, comprising:

detecting an object moving within the environment;

determining a plurality of location-points, each location-point is determined based on one or more detected appearances of the object in the captured images;

determining object parameters;

determining a trajectory of movement of the object based on the plurality of location-points and parameters;

selecting a best fitting motion model to the trajectory from a plurality of available motion models, and determining a state of the object based on the best fitting motion model;

determining at least one intersection point between the object and a target object, generating an activity world as a virtual environment that corresponds to the environment, defining an activity area having specific boundaries within the activity world, the activity area being assigned with one or more attributes defining one or more constraints on a manner in which an activity of a user should be performed, detecting based on the at least one intersection point an interaction of the user with the object, following detection of interaction of the user with the object:
  determining an area of interaction within the activity world;
  determining whether the area of interaction overlaps with the activity area, and if so:
    determining whether one or more interaction attributes comply with the one or more attributes assigned to the activity area; and
    determining a level of success in performing the activity of the user.

10. The method of claim 9, further comprising:
  continuously updating the trajectory of the object using additional location-points, to thereby generate an updated trajectory;
  comparing the updated trajectory with a plurality of motion models to determine a best fitting motion model to the updated trajectory;
  identifying a change in the state of the object, in case it is determined that a motion model that is different from the selected motion model has a best fit to the updated trajectory.

11. The method of claim 9 further comprising, for determining the trajectory of the moving object based on the plurality of location-points and parameters:
  defining a sliding window encompassing a sub-group of the plurality of location-points;
  shifting the position of the sliding window along the plurality of location points;
  for each window position:
    determining, based on a respective sub-group of location-points in the window, a selected motion model having a best fit to a sub-section of the trajectory consisting of the sub-group of location-points; and
  assigning a current state to the moving object according to the selected motion model determined for the plurality of windows.

12. The method of claim 9 further comprising, for determining the at least one intersection point between the object and the target object:
  estimating a plurality of future trajectories of the moving object at a time of intersection with the target object, thereby obtaining a plurality of candidate intersection points;
  calculating a distribution of the plurality of candidate intersection points; and
  determining a final intersection point if a distance of the object from the target object is less than a predefined distance and a variance of the distribution is less than a predefined value.

13. The method of claim 9 further comprising following determination of the at least one intersection point between the object and the target object:
  determining whether the at least one intersection point, complies with the one or more attributes, and determining a level of success in performing the interaction accordingly.

14. The method of claim 9 wherein processing of the images is performed in real-time while the images are being captured.

15. The method of claim 9 further comprising adapting a camera frame rate according to the state of the object.

16. A non-transitory computer readable storage medium tangibly embodying a program of instructions that, when executed by at least one computer, cause the at least one computer to perform:
  obtaining captured images of an environment;
  processing the captured images, comprising:
    detecting an object moving within the environment;
    determining a plurality of location-points, each location-point is determined based on one or more detected appearances of the object in the captured images;
    determining object parameters;
    determining a trajectory of movement of the object based on the plurality of location-points and parameters;
    selecting a best fitting motion model to the trajectory from a plurality of available motion models, and determining a state of the object based on the best fitting motion model;
    determining at least one intersection point between the object and a target object,
  generating an activity world as a virtual environment that corresponds to the environment,
  defining an activity area having specific boundaries within the activity world, the activity area being assigned with one or more attributes defining one or more constraints on a manner in which an activity of a user should be performed,
  detecting based on the at least one intersection point an interaction of the user with the object,
  following detection of interaction of the user with the object:
    determining an area of interaction within the activity world;
    determining whether the area of interaction overlaps with the activity area, and if so:
      determining whether one or more interaction attributes comply with the one or more attributes assigned to the activity area; and
      determining a level of success in performing the activity of the user.

17. A non-transitory computer readable storage medium tangibly embodying a program of instructions that, when executed by at least one computer, cause the at least one computer to perform:
  obtaining captured images of an environment;
  processing the captured images, comprising:
    detecting an object within the environment;
    determining a plurality of location-points, each location-point is determined based on one or more detected appearances of the object in the captured images;
    determining object parameters;
    determining a trajectory of movement of the object based on the plurality of location-points and parameters;
    selecting a best fitting motion model to the trajectory from a plurality of available motion models, and determining a state of the object based on the best fitting motion model; and
    determining at least one intersection point between the object and a target object, said determining comprising:
      estimating a plurality of future trajectories of the moving object at a time of intersection with the target object, thereby obtaining a plurality of candidate intersection points;
      calculating a distribution of the plurality of candidate intersection points; and determining a final intersection point if a distance of the object from the target object is less than a predefined distance and a variance of the distribution is less than a predefined value.

18. A non-transitory computer readable storage medium tangibly embodying a program of instructions that, when executed by at least one computer, cause the at least one computer to perform:

obtaining captured images of an environment;
processing the captured images, comprising:
detecting an object within the environment;
determining a plurality of location-points, each location-point is determined based on one or more detected appearances of the object in the captured images;
determining object parameters;
determining a trajectory of movement of the object based on the plurality of location-points and parameters;
defining a sliding window encompassing a sub-group of the plurality of location-points;
shifting the position of the sliding window along the plurality of location-points;
for each window position:
determining, based on a respective sub-group of location-points in the window, a selected motion model having a best fit to a sub-section of the trajectory consisting of the sub-group of location-points;
assigning a current state to the object according to the selected motion model determined for the plurality of windows,
and
determining at least one intersection point between the object and a target object.

* * * * *